Jan. 20, 1931. L. D. SOUBIER 1,789,480
METHOD AND APPARATUS FOR FEEDING MOLTEN GLASS
Filed Aug. 22, 1927 2 Sheets-Sheet 2

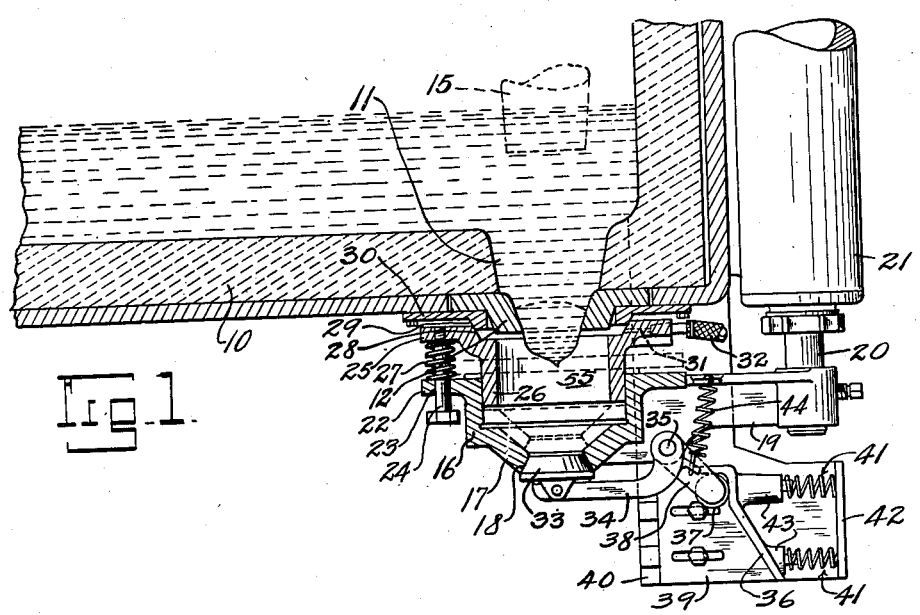

Patented Jan. 20, 1931

1,789,480

UNITED STATES PATENT OFFICE

LEONARD D. SOUBIER, OF TOLEDO, OHIO, ASSIGNOR TO OWENS-ILLINOIS GLASS COMPANY, OF TOLEDO, OHIO, A CORPORATION OF OHIO

METHOD AND APPARATUS FOR FEEDING MOLTEN GLASS

Application filed August 22, 1927. Serial No. 214,522.

The present invention relates to improvements in method and apparatus for feeding molten glass and more particularly to that type of feeder embodying a lateral furnace extension or boot formed with a bottom outlet orifice, from the walls of which formed charges of molten glass are periodically suspended for severance and delivery to the molds of a ware forming machine.

An object of the present invention is to provide glass feeding apparatus of the above character with automatic means operating upon the glass from above and below the outlet orifice to regulate the discharge of glass through said orifice. According to the present invention, this automatic control means includes a mechanical flow regulator projecting into the glass over the outlet orifice and cooperating with mechanism arranged below said orifice adapted to alternately apply air pressure and vacuum to the lower side of the molten glass within said orifice. This alternate application of air pressure and vacuum is properly timed with operation of the mechanical flow regulator so that alternate acceleration and retardation of the glass flow is exceptionally effective and contributes materially to the formation of charges of uniform weight and shape. Another advantage resulting from the above combination is the reheating of the stub of the glass which is chilled by the shears and ordinarily left projecting from the discharge orifice following severance of mold charges. The application of air pressure to the glass from below the orifice, forces this chilled projecting stub back into the orifice where it is completely reheated and reassimilated by the main supply body of glass. Thus, the issuing glass is at all times maintained in the best possible condition for working.

A further object is to provide a cup adapted to periodically enclose the lower side of the bottom outlet orifice in a container for molten glass, said cup forming a part of the means for applying air pressure and vacuum in alternation as above pointed out. This cup is preferably of such construction and so mounted that it reciprocates axially of the path followed by charges being delivered to a forming mold and while at the lower end of said path, assumes a form in which it functions as a funnel guide for the mold charges.

In the accompanying drawings:

Fig. 1 is a sectional view showing the application of the present invention to a feeder boot, the dotted line positions of the capping device, and the stub of glass being those occupied just following delivery of a formed charge of glass to a mold and just prior to beginning the formation of the next succeeding charge.

Fig. 2 is a view similar to Fig. 1, showing the device functioning as a funnel guide.

Figure 3:
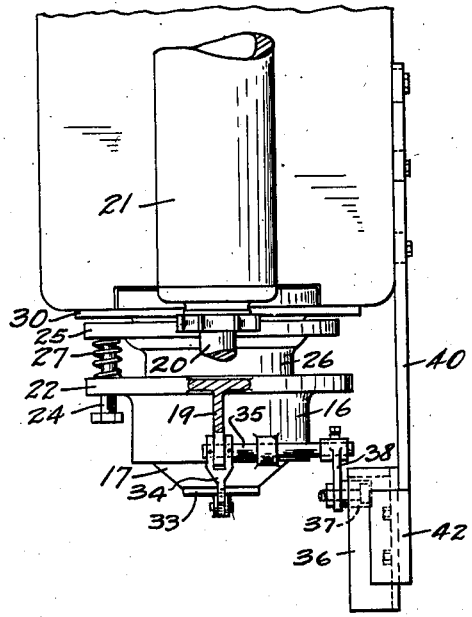
Fig. 3 is a front elevation with parts in section, showing the application of the present invention to a feeder boot.

Referring to the accompanying drawings, the lateral furnace extension or feeder boot 10 is formed with a bottom outlet orifice 11 provided with an outlet bushing 12, from the walls of which formed charges of molten glass are periodically suspended and severed by suitable shears 13 for delivery to shaping molds 14 of a forming machine (not shown). While other suitable regulators may be employed to control the flow of glass through the bottom outlet orifice, for the purpose of the present application a reciprocation plunger 15 is utilized.

The means to apply air pressure and vacuum to the glass from below the outlet orifice includes a cup 16 (Fig. 1) preferably of cylindrical formation and provided with downwardly and inwardly tapered bottom walls 17 in which an axial outlet opening 18 is formed. This cup is fixed to the outer end of an arm 19 mounted upon the lower end of the piston rod 20 of an air motor 21 which is preferably supported by the feeder boot and is adapted to be operated in proper timed relation to movements of the shears 13 and the forming machine (not shown), and the flow regulator 15. Any suitable timing mechanism may be employed for this purpose. A radial top flange 22 extending around the upper end of the body of the cup 16 is formed with guide openings 23 through which bolts 24 project for connection to a flange 25 of a sleeve 26 with telescopes within the tubular body portion of the cup 16. Coil springs 27 encircling the bolts operate to normally hold the sleeve 26 and the cup 16 in their outermost or extended positions as shown in Fig. 2. The inner wall 28 at the upper end of the sleeve 26 (Fig. 1) is tapered and adapted to snugly contact with a tapered seat 29 formed on the bushing retaining ring 30 as shown in Fig. 1. Thus, a substantially airtight joint is formed, permitting effective formation of either sub-atmospheric or super-atmospheric pressure internally of the chamber 55 formed by the cup and sleeve. This flange 25 (Fig. 1) also is formed with a radial opening 31 through which air pressure or vacuum may be applied internally of said chamber by way of a flexible pipe 32 leading from any suitable source of vacuum or air pressure supply (not shown).

The opening 18 in the bottom of the cup 16 is closable by means of a plug 33 pivoted to a supporting arm 34 which in turn is hinged by a pin 35 to the cup supporting arm 19. This closure plug 33 is held in cup closing position at proper intervals by a cam 36 which operates through a cam roll 37 and a finger 38 carrying the cam roll to rock the arm 34 about the hinge 35 as shown in Fig. 1. This cam 36 is carried by a base plate 39 having bolt and slot connection with a bracket 40 which, in turn, is rigidly fixed to the feeder boot 10. Coiled springs 41 arranged one above the other (Fig. 1) between a lateral flange 42 on the bracket 40 and suitable guides 43 on the cam 36, function as a safety device to prevent breaking of any of the elements in the event the closure plug operating mechanism becomes jammed.

When the cup 16 and sleeve 26 move downwardly relative to the associated elements, a coil spring 44 (Figs. 1 and 2) operates to swing the plug carrying arm 34 downwardly to the Fig. 2 position permitting the device to function as a funnel guide.

In operation, assuming the parts to be initially positioned as shown in dotted lines in Fig. 1, the regulating plunger 15 is moved downwardly to accelerate expulsion of glass through the bottom outlet orifice 11. Simultaneously with this expulsive action on the part of the regulator 15, the cup 16 is moved downwardly relative to the sleeve or tube 26 to thereby create sub-atmospheric pressure internally of the chamber and accelerate discharge of glass through the orifice 11. Also, a partial vacuum is created within the chamber 55 by exhaustion of air through the pipe 32. Thus, the molten glass is expelled from the feeder boot and suspended from the walls of the outlet bushing 12 as a formed charge ready for severance and delivery to a shaping mold 14.

As the shaping mold 14 approaches the charge receiving station in vertical alignment with the bottom outlet orifice 11, the air motor 21 operates to lower the capping device to the position shown in Fig. 2. During this lowering operation, the bottom closing plug 33 is swung to the position shown in Fig. 2, thereby transforming the capping device into a funnel guide by which the charge of glass is accurately directed to the receiving end of the mold 14, it being understood that at a predetermined time interval following initial downward movement of the cup, the shears 13 operate to sever the suspended charge from the main body of glass. Immediately following delivery of the charge of glass to the forming mold 14 and substantially simultaneously with upward movement of the flow regulator 15, the air motor 21 operates to return the capping device to the full line position shown in Fig. 1 in which the bottom closing plug 33 also has resumed a position in which it closes to the bottom of the cup 16. The air motor 21 continues to lift the cup 16, causing movement of the latter relative to the sleeve 26 which has, at this period of operation, come into contact with the bushing ring 30 (Fig. 1). This continued movement of the cup 16 relative to the sleeve 26, creates super-atmospheric pressure within the chamber 55, thereby operating to force the projecting surface chilled stub of glass back into the feeder boot so that it may be completely reheated and reassimilated by the main body of glass. Thus, it is seen that this device maintains the glass in the best possible condition for the formation into mold charges, materially assists in rapid formation of charges of uniform size and weight, and insures proper delivery of the formed charges to the shaping molds of the forming machine.

Figure 4:
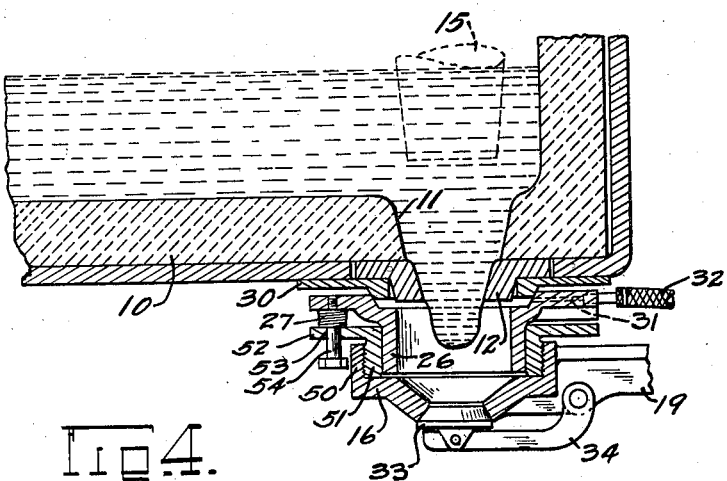
Fig. 4 is a fragmentary sectional view showing the use of an adapter whereby caps having different sized outlet openings may be used.

In Fig. 4, there is shown means whereby different sized sleeves 26 may be used with a single cup. In this form, the main body 50 of the cup 16 is internally threaded for engagement with an adapter 51 (Fig. 4) formed with a radial flange 52 having guide openings 53 formed therein to receive bolts 54 which interconnect said adapter 51 and the sleeve 26. By providing a structure such as shown in Fig. 4, the sleeves 26 are readily interchangeable as required by the particular operating conditions and size or shape of charges being formed.

Manifestly, certain minor changes may be resorted to within the spirit and scope of the appended claims.

What I claim is:

1. In combination, a container for a supply body of molten glass having a bottom outlet orifice, a mold adapted for periodic positioning below and in line with said orifice, means to cause periodic delivery of formed mold charges from the container to said mold, and means mounted for reciprocation axially of the path of travel of the mold charges acting as a charge guide while at one end of its path of movement and to enclose the lower end of the discharge orifice while at the other end of said path of movement.

2. In combination, a container for molten glass having a bottom outlet orifice, a mold adapted for periodic positioning below and in line with said orifice, means to cause periodic delivery of formed mold charges from the container to said mold, a cup mounted for reciprocation axially of the path of movement of the mold charges, said cup having a closable bottom outlet, means to position the cup to enclose the lower end of said outlet orifice, and means to open the outlet in the cup bottom when said cup is positioned at the lower end of its path of travel whereby said cup functions as a funnel guide for charges being delivered to the mold.

3. In combination, a container for molten glass having a bottom outlet orifice, a mold adapted for periodic positioning below and in line with said orifice, means to cause periodic delivery of formed mold charges from the container to said mold, a cup mounted for reciprocation axially of the path of movement of the mold charges, said cup having a closable bottom outlet, means to position the cup to enclose the outlet orifice of the glass container, means to alternately increase and decrease pressure within the cup while the latter encloses the lower end of said outlet orifice, and means to open the outlet in the cup bottom following initial downward movement of the latter, whereby said cup functions as a funnel guide for charges being delivered to the mold.

4. In combination, a container for molten glass having a bottom outlet orifice, a mold adapted for periodic positioning below and in line with said orifice at times, means to cause periodic delivery of formed mold charges from the container to said mold, a cup mounted for reciprocation axially of the path of movement of the mold charges, said cup having a closable bottom outlet, means to position the cup to enclose the lower end of said outlet orifice, means to vary pressure internally of the cup to cause alternate inward and outward movement of glass in said bottom outlet orifice, means to open the bottom outlet in the cup following initial downward movement of the latter, whereby said cup operates to guide mold charges to the mold, and a glass flow regulator projecting into the glass in said container.

5. In combination, a container for molten glass having a bottom outlet orifice, mechanical flow regulating means projecting into the glass above said outlet orifice, a cup adapted to periodically enclose the lower side of said orifice, means to alternately apply air pressure and vacuum internally of the cup in timed relation with movements of the mechanical flow regulating device to cause periodic suspension of formed charges of glass from the walls of said orifice, means to sever the suspended charges from the main body of glass, a shaping mold having a charge receiving opening at its upper end adapted for positioning in vertical alignment with the discharge orifice periodically, means to lower said cup to a position adjacent the charge receiving end of said mold in advance of the charge severing operation, and means to open the bottom of said cup whereby the latter functions as a funnel guide for the severed charges.

6. In combination, a container for molten glass having a bottom outlet orifice, mechanical flow regulating means projecting into the glass above said outlet orifice, a cup adapted to periodically enclose the lower side of said orifice, means to alternately apply air pressure and vacuum internally of the cup in timed relation with movements of the mechanical flow regulating device to cause periodic suspension of formed charges of glass from the walls of said orifice, means to sever the suspended charges from the main body of glass, a shaping mold having a charge receiving opening at its upper end adapted for positioning in vertical alignment with the discharge orifice periodically, means to lower said cup to a position adjacent the charge receiving end of said mold in advance of the charge severing operation, means to open the bottom of said cup whereby the latter functions as a funnel guide for the severed charges, and automatic means operating to reciprocate said cup in timed relation to movement of the mechanical flow regulating means and actuation of the charge severing means.

7. In combination, a container for molten glass having a bottom outlet orifice, a cup arranged to periodically enclose the lower side of said orifice, said cup comprising a pair of telescoped sections, means to normally hold said sections in their extended positions, means to cause a relative movement of said sections while the cup encloses said outlet orifice to create super-atmospheric pressure internally of the cup causing upward movement of glass in said orifice, and means operating at predetermined time intervals to apply vacuum internally of the cup to accelerate outward flow of glass through said orifice.

8. In combination, a container for molten glass having a bottom outlet orifice, a cup arranged to periodically enclose the lower side of said orifice, said cup comprising a pair of telescoped sections, means to normally hold said sections in their extended position, means to cause a relative movement of said sections when the cup encloses said outlet orifice to create super-atmospheric pressure internally of the cup causing upward movement of glass in said orifice, means operating at predetermined time intervals to apply vacuum internally of the cup to accelerate outward flow of glass through said orifice, said cup having a closable bottom outlet, means to close said bottom outlet while the cup encloses the lower side of said outlet orifice, means to move said cup vertically downward away from said container, and means to open the bottom outlet in the cup at a predetermined point in the downward movement of said cup whereby the latter may function as a funnel guide.

9. In combination, a container for a supply body of molten glass having a bottom outlet orifice, a sectional telescopic cup arranged for movement below and in axial alignment with the outlet orifice, means to periodically position the cup to enclose the lower side of said outlet orifice, means to manipulate the cup sections to create super-atmospheric pressure therein causing upward movement of glass in the orifice, means to create sub-atmospheric pressure within the cup in alternation with the creation of super-atmospheric pressure therein to thereby accelerate flow of glass through the orifice, means to open the bottom of said cup at predetermined time intervals, and means to sever mold charges from the issuing glass.

10. A glass feeder comprising a container for a supply of molten glass having a bottom outlet orifice, means to periodically accelerate and retard flow of glass through said outlet orifice to suspend formed mold charges from the walls thereof, said means including a cup adapted to periodically enclose the lower side of said orifice, said cup having a bottom outlet, a closure plug for said outlet, means to reciprocate said cup axially of the path of movement of charges away from the bottom outlet orifice, automatic means to position said closure plug to close the cup outlet while the cup is arranged to enclose the bottom outlet orifice and to position said plug at one side of the outlet at a point following initial downward movement of said cup, whereby the cup functions as a funnel guide, and means to sever charges suspended from the walls of the outlet orifice.

11. A glass feeder comprising a container for a supply of molten glass having a bottom outlet orifice, means to periodically accelerate and retard flow of glass through said outlet orifice to suspend formed mold charges from the walls thereof, said means including a cup adapted to periodically enclose the lower side of said orifice, said cup having a bottom outlet, a closure plug for said outlet, means to reciprocate said cup axially of the path of movement of charges away from the bottom outlet orifice, cam mechanism operating to move the plug to close the cup outlet while the cup is in its uppermost position and to open said outlet following initial downward movement of the cup, whereby the cup functions as a funnel guide, and means to sever charges suspended from the walls of the outlet orifice.

12. A glass feeder comprising a container for a supply of molten glass having a bottom outlet orifice, means to periodically accelerate and retard flow of glass through said outlet orifice to suspend formed mold charges from the walls thereof, said means including a cup adapted to periodically enclose the lower side of said orifice, means to alternately create sub-atmospheric pressure and super-atmospheric pressure internally of the cup while the latter is in position to enclose the lower side of said outlet orifice, said cup having a bottom outlet, a closure plug for said outlet, means to reciprocate said cup axially of the path of movement of mold charges away from the bottom outlet orifice, and cam mechanism operating to move the plug to close the cup outlet while the cup is in its uppermost position and to open said outlet following initial downward movement of the cup.

13. The combination of a container for a supply body of molten glass having a bottom outlet orifice thru which the glass issues, means for periodically severing the issued glass, a funnel guide mounted at the bottom of the outlet, means for periodically closing the discharge end of the funnel guide to provide a closure device, and means for periodically moving said guide downward from the outlet in timed relation to the glass severing operations.

14. The combination of a container for a supply body of molten glass having a bottom outlet orifice, a closure device beneath said orifice to receive the issuing glass, said closure device comprising vertically telescoping sections, and means to periodically sever the issued glass.

15. The combination of a container for a supply body of molten glass having a bottom outlet orifice, a closure device beneath said orifice to receive the issuing glass, said closure device comprising vertically telescoping sections, the lower section comprising tapered walls and having a bottom outlet opening, and means to periodically sever the issued glass.

16. The combination of a container for molten glass having a bottom outlet orifice thru which the glass issues, a closure device at the bottom of the orifice to receive the issuing glass, means for periodically lowering the closing device, means for periodically severing the issued glass at a plane above the lowered closure device, and means for transforming said closure device into a funnel guide thru which the glass is discharged.

17. The combination of a container for molten glass having a bottom outlet orifice thru which the glass issues, a closure device beneath the orifice to receive the issuing glass, means for periodically severing the issued glass, and means for periodically moving said closure device vertically downward and transforming it into an open guide thru which the severed glass is delivered.

18. The combination of a container for molten glass having a bottom outlet thru which the glass is discharged, means providing a closed chamber beneath the outlet into which the glass is received as it issues for said outlet, automatic means for periodically expanding and contracting said chamber and thereby periodically varying the air pressure within the chamber, and means to periodically sever the issued glass.

Signed at Toledo, in the county of Lucas and State of Ohio, this 11th day of August, 1927.

LEONARD D. SOUBIER.